United States Patent
Mamba et al.

(10) Patent No.: US 8,537,125 B2
(45) Date of Patent: Sep. 17, 2013

(54) ELECTROSTATIC CAPACITY TOUCH PANEL HAVING A PLURALITY OF FIRST, SECOND AND THIRD ELECTRODES

(75) Inventors: Norio Mamba, Kawasaki (JP); Tsutomu Furuhashi, Yokohama (JP); Kouichi Anno, Chiba (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 1072 days.

(21) Appl. No.: 12/496,826

(22) Filed: Jul. 2, 2009

(65) Prior Publication Data
US 2010/0020032 A1 Jan. 28, 2010

(30) Foreign Application Priority Data
Jul. 25, 2008 (JP) ................. 2008-191868

(51) Int. Cl.
*G06F 3/041* (2006.01)
*G06F 3/045* (2006.01)
*G06F 3/044* (2006.01)

(52) U.S. Cl.
USPC .......... 345/173; 345/174; 178/18.06

(58) Field of Classification Search
USPC ............ 345/173–174; 361/280; 178/18.02, 178/18.06; 349/12
See application file for complete search history.

(56) References Cited

U.S. PATENT DOCUMENTS

| 4,087,625 A | 5/1978 | Dym et al. |
| 5,432,671 A * | 7/1995 | Allavena ................. 361/280 |
| 5,510,813 A | 4/1996 | Makinwa et al. |
| 5,565,658 A * | 10/1996 | Gerpheide et al. ......... 178/18.02 |
| 5,942,733 A | 8/1999 | Allen et al. |
| 6,002,389 A | 12/1999 | Kasser |
| 6,239,788 B1 * | 5/2001 | Nohno et al. ............. 345/173 |
| 7,030,860 B1 * | 4/2006 | Hsu et al. ................ 345/173 |
| 2007/0257894 A1 * | 11/2007 | Philipp .................... 345/173 |
| 2007/0279395 A1 | 12/2007 | Philipp et al. |
| 2008/0138589 A1 | 6/2008 | Wakabayashi et al. |
| 2008/0142352 A1 | 6/2008 | Wright |
| 2009/0256821 A1 | 10/2009 | Mamba et al. |
| 2010/0271330 A1 | 10/2010 | Philipp |

FOREIGN PATENT DOCUMENTS

| DE | 20 2007 005 237 | 7/2007 |
| JP | 53-84420 | 7/1978 |
| JP | 54-160136 | 12/1979 |
| JP | 58-94051 U | 6/1983 |
| JP | 07-64725 | 3/1995 |

(Continued)

*Primary Examiner* — Chanh Nguyen
*Assistant Examiner* — James Nokham
(74) *Attorney, Agent, or Firm* — Antonelli, Terry, Stout & Kraus, LLP.

(57) ABSTRACT

A display device having an electrostatic capacity touch panel includes: X electrodes XP and Y electrodes YP which intersect each other via a first insulating layer; and a plurality of Z electrodes disposed in a floating state via a second insulating layer. For the second insulating layer, a material such as an elastic insulating material which changes in thickness by pressing of touch is used. The Z electrode is disposed so as to overlap both one of the X electrodes and one of the Y electrodes. A pad part of the X electrode has a largest area in the vicinity of a thin line part of the X electrode, and a smallest area in the vicinity of the thin line part of the adjacent X electrode. An area of the pad part is reduced as the pad part departs from the thin line part of the X electrode.

15 Claims, 18 Drawing Sheets

(56) References Cited

FOREIGN PATENT DOCUMENTS

| | | |
|---|---|---|
| JP | 8-507396 | 8/1996 |
| JP | 2000-047808 | 2/2000 |
| JP | 2003-511799 | 3/2003 |
| JP | 2006-126997 | 5/2006 |
| JP | 2007-299409 | 11/2007 |
| JP | 2008-98169 | 4/2008 |
| JP | 2009-258888 | 11/2009 |
| KR | 10-0659048 | 12/2006 |
| KR | 10-2007-0108077 | 11/2007 |
| WO | WO94/14112 | 6/1994 |
| WO | WO 01/27868 A1 | 4/2001 |

* cited by examiner

CONTACT SURFACE
POSITION : XA

CONTACT SURFACE
POSITION : XB

CONTACT SURFACE
POSITION : XC

CONTACT SURFACE
POSITION:YA

CONTACT SURFACE
POSITION:YB

CONTACT SURFACE
POSITION:YC

CONTACT SURFACE POSITION

CONTACT SURFACE
POSITION:XA

CONTACT SURFACE
POSITION:XB

CONTACT SURFACE
POSITION:XC

ELECTROSTATIC CAPACITY TOUCH PANEL HAVING A PLURALITY OF FIRST, SECOND AND THIRD ELECTRODES

CROSS-REFERENCE TO RELATED APPLICATION

The present application claims priority from Japanese application JP 2008-191868 filed on Jul. 25, 2008, the content of which is hereby incorporated by reference into this application.

BACKGROUND OF THE INVENTION

1. Field of the Invention

The present invention relates to a display device including the input device for inputting coordinates to a screen, and more particularly, to a display device which includes an input device of a capacity coupling type and which is suitable for achieving high coordinate detection accuracy.

2. Description of the Related Art

A display device including an input device (hereinafter, also referred to as "touch sensor" or "touch panel") having an on-screen input function of inputting information to a display screen by a touch operation (contact and press operation, hereinafter, simply referred to as "touch") with a user's finger or the like is used for a mobile electronic device such as a PDA or a mobile terminal, various home electric appliances, a stationary customer guiding terminal such as an automatic reception machine, and the like. As the input device using the touch, there are known a resistance film method of detecting a change in resistance value of a touched portion, an electrostatic capacity coupling method of detecting a change in capacitance thereof, an optical sensor method of detecting a change in quantity of light at the portion shielded by the touch, and the like.

The electrostatic capacity coupling method has the following advantages when compared with the resistance film method or the optical sensor method. For example, the electrostatic capacity coupling method is advantageous in that, as opposed to a low transmittance of the resistance film method or the optical sensor method of about 80%, a transmittance of the electrostatic capacity coupling method is as high as about 90%, thereby preventing a reduction in displayed image quality. In the resistance film method, a touch position is detected by mechanical contact of the resistance film, thereby leading to possible deterioration or breakage of the resistance film. However, in the electrostatic capacity coupling method, there is no mechanical contact such as contact of a detection electrode with another electrode. Thus, the electrostatic capacity coupling method is also advantageous in durability.

An exemplary touch panel using the electrostatic capacity coupling method is discussed in JP 2003-511799 A. In the method disclosed therein, a vertical electrode (X electrode) and a horizontal electrode (Y electrode) are arranged for detection in vertical and horizontal two-dimensional matrix, and a capacity of each electrode is detected by an input processing unit. When a conductor such as a finger touches a surface of the touch panel, the capacity of each electrode increases. Thus, the input processing unit detects this capacity increase to calculate input coordinates based on a signal of a capacity change detected by each electrode. Even when the detection electrode is deteriorated to change a resistance value as physical characteristics, its influence on capacity detection is limited. Thus, there is only a little influence on input position detection accuracy of the touch panel. As a result, high input position detection accuracy may be realized.

However, in the touch panel using the electrostatic capacity coupling method, as discussed in JP 2003-511799 A, the capacity change of each detection electrode is detected, and input coordinates are detected. Hence, input means needs to be made of a conductive material. Thus, when a stylus made of a nonconductive resin used by the resistance film method is brought into contact with the touch panel using the electrostatic capacity coupling method, almost no capacity change occurs in the electrode, which disables detection of the input coordinates.

When a stylus is made of a conductive material such as a metal on the other hand, and an input operation is performed on the touch panel using the electrostatic capacity coupling method with the use of the stylus, the number of electrodes increases. For example, it is assumed that an electrostatic capacity coupling type touch panel having a diagonal size of 4 inches and a vertical and horizontal size ratio of 3:4 is realized in an electrode shape based on a diamond shape as described in JP 2003-511799 A. When a finger is an input target, if a minimum contact surface has a diameter of 6 mm, and detection electrodes are prepared by using this size as an electrode interval, the total number of electrodes is 22. If a contact surface of the stylus has a diameter of 1 mm, and detection electrodes are prepared by using this size as an electrode interval, on the other hand, the total number of electrodes is 139, which indicates an increase of about six times. The increased number of electrodes causes an increase in frame area necessary for laying wiring lines in the input processing unit, and an increase in number of signal connections with a control circuit, consequently lowering reliability against shock and the like. Further, a circuit area increases due to an increase in number of terminals of the input processing unit, thereby leading to a fear of a cost increase.

As apparent from the foregoing, in the electrostatic capacity coupling type touch panel as disclosed in JP 2003-511799A, a reduction in number of electrodes is a challenge when an input operation by using the nonconductive material and the input means having a small contact surface are dealt with.

SUMMARY OF THE INVENTION

In order to meet the above-mentioned challenge, the present invention employs an electrostatic capacity touch panel including: a plurality of X electrodes; a plurality of Y electrodes; and one of a plurality of Z electrodes and one Z electrode. In the electrostatic capacity touch panel, each of the plurality of X electrodes and each of the plurality of Y electrodes intersect each other via a first insulating layer, and are formed so as to alternately array pad parts and thin line parts in extending directions of the each of the plurality of X electrodes and the each of the plurality of Y electrodes, and the pad part of the each of the plurality of X electrodes and the pad part of the each of the plurality of Y electrodes are disposed so as not to overlap each other in plan view. When the electrostatic capacity touch panel includes the plurality of Z electrodes, each of the plurality of Z electrodes is formed via a second insulating layer so as to overlap both one of the plurality of X electrodes and one of the plurality of Y electrodes which are adjacent to each other in plan view, and the plurality of Z electrodes are disposed in an electrically floating state. In this case, the second insulating layer may be formed of a material such as an elastic insulating material which changes in thickness by pressing of touch, thereby making it possible to cause a capacity change between the each of the plurality of X electrodes and the each of the plurality of Y electrodes, and the each of the plurality of Z electrodes even with the nonconductive input means. As a result, touch may be detected by the electrostatic capacity coupling method. Further, when the electrostatic capacity touch panel includes the one Z electrode, the one Z electrode is formed via the second insulating layer so as to overlap both the plurality of X electrodes and the plurality of Y electrodes in plan view, and the one Z electrode is in the electrically floating state. In this case, the second insulating layer may be formed of the material such as the elastic insulating material which changes in thickness by pressing of touch, thereby making it possible to cause the capacity change between the each of the plurality of X electrodes and the each of the plurality of Y electrodes, and the one Z electrode even with the nonconductive input means. As a result, touch may be detected by the electrostatic capacity coupling method.

Further, the pad part of the each of the plurality of X electrodes may extend to a vicinity of the thin line part of one of the plurality of X electrodes adjacent to the each of the plurality of X electrodes. In plan view, in a shape of the pad part of the each of the plurality of X electrodes, an area may be smallest in the vicinity of the thin line part of the adjacent one of the plurality of X electrodes and an area may be largest in the vicinity of the thin line part of the each of the plurality of X electrodes. An area of the pad part may be reduced from the vicinity of the thin line part of the each of the plurality of X electrodes to the vicinity of the thin line part of the adjacent one of the plurality of X electrodes. Thus, even when an electrode interval of the plurality of X electrodes is larger than a contact surface of a touch operation, a touch coordinate position may be calculated based on a ratio of detected capacity components of the adjacent X electrodes, thereby making it possible to perform highly accurate position detection with a small number of electrodes.

Further, the one of the plurality of Z electrodes and the one Z electrode is formed so as to overlap both the plurality of X electrodes and the plurality of Y electrodes which are adjacent to each other, whereby a capacity change may be detected at the adjacent one of the plurality of Y electrodes through the one of the plurality of Z electrodes and the one Z electrode even when there is a contact surface of the touch above the plurality of X electrodes, and a capacity change may be detected at the adjacent one of the plurality of X electrodes through the one of the plurality of Z electrodes and the one Z electrode even when there is a contact surface of the touch above the plurality of Y electrodes. Thus, input coordinates may be detected on the entire surface of the touch panel. Simultaneously, the number of Y electrodes may be reduced.

According to the present invention, contriving shapes and an arrangement of the electrodes of the touch panel enables position detection with a smaller number of electrodes and with higher accuracy compared with the conventional case.

DETAILED DESCRIPTION OF THE INVENTION

Figure 1:
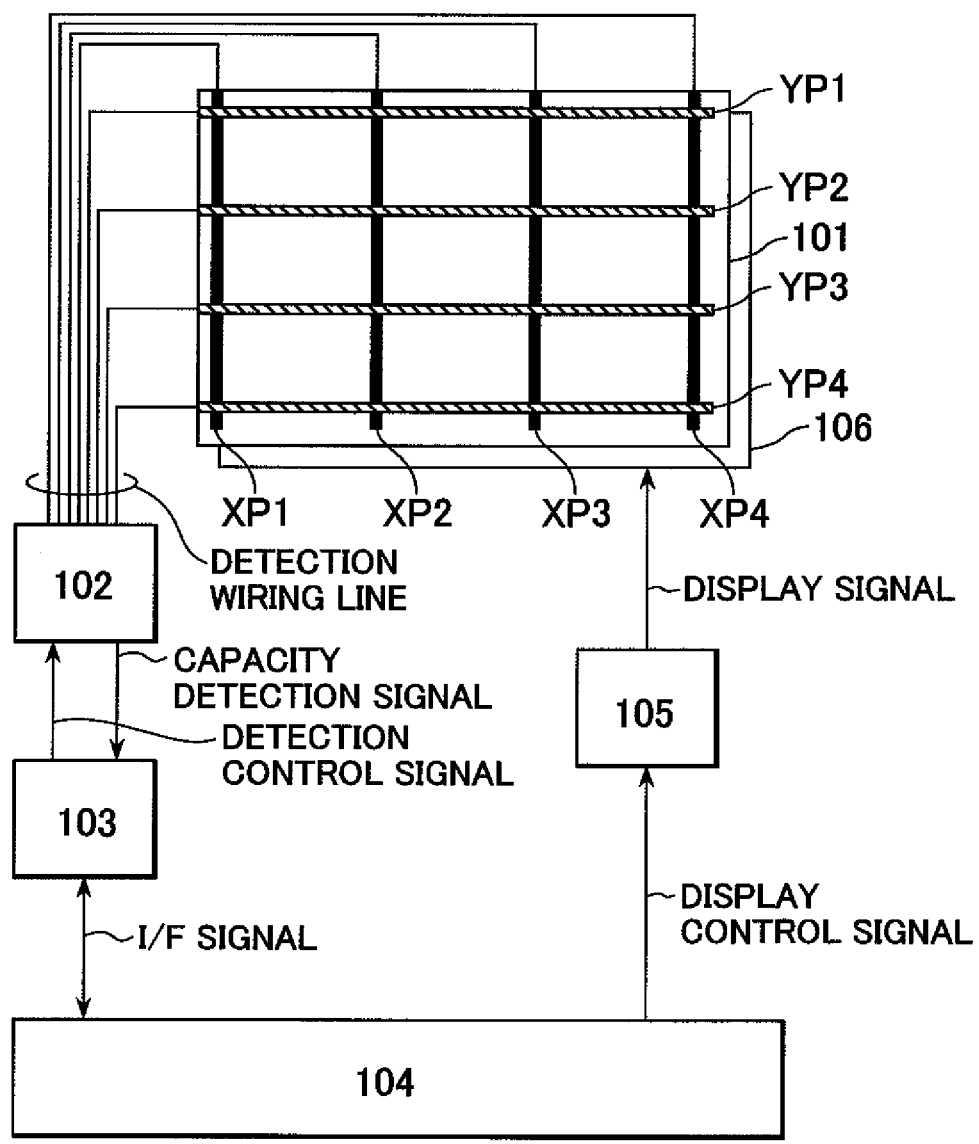
FIG. 1 illustrates a system configuration of an input device and a display device including the input device according to a first embodiment of the present invention.

Referring to the drawings, preferred embodiments of the present invention are described below in detail.

First Embodiment

FIG. 1 illustrates configurations of an input device (hereinafter, referred to as a touch panel) and a display device including the input device.

In FIG. 1, a reference numeral 101 denotes a touch panel according to a first embodiment. The touch panel 101 includes capacity detection X and Y electrodes XP and YP. For example, four (XP1 to XP4) X electrodes and four (YP1 to YP4) Y electrodes are illustrated in this case. It should be noted that the numbers of electrodes are not limited thereto. The touch panel 101 is installed in a front face of a display device 106. Thus, when a user views an image displayed on the display device, a transmittance of the touch panel is preferably high because the displayed image needs to pass through the touch panel. The X and Y electrodes of the touch panel 101 are connected to a capacity detection unit 102 via detection wiring lines. The capacity detection unit 102 is controlled based on a detection control signal output from a control calculation unit 103 to detect a capacity of each electrode (each of X and Y electrodes) included in the touch panel, and to output a capacity detection signal changed depending on a capacity value of each electrode to the control calculation unit 103. The control calculation unit 103 calculates a signal component of each electrode from the capacity detection signal of each electrode, and calculates input coordinates from the signal component of each electrode. A system 104 generates, when receiving the input coordinates transferred from the touch panel 101 by a touch operation, a displayed image according to the touch operation, and transfers the displayed image as a display control signal to a display control circuit 105. The display control circuit 105 generates a display signal according to the displayed image transferred as the display control signal, and displays an image on the display device.

Figure 2:
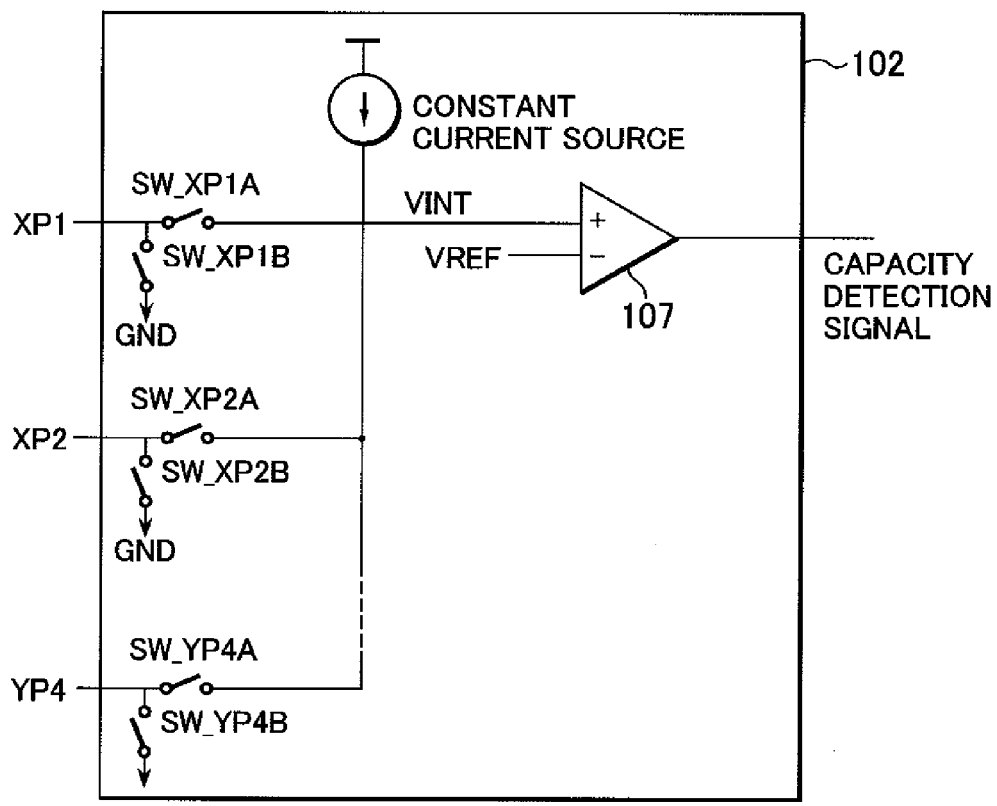
FIG. 2 illustrates a configuration of a circuit of a capacity detection unit.

FIG. 2 illustrates a configuration of a circuit of the capacity detection unit 102. Here, a capacity detection circuit using current integration is taken as an example. However, a capacity detection method is not limited thereto. Any method that is capable of detecting a capacity of the capacity detection electrode of the touch panel or a capacity change, for example, a capacity detection method based on a switched capacitor using a switch and a capacity or a charged transfer method using a switch and a capacity to transport charges to the capacity, is applicable. The capacity detection circuit using current integration, which is illustrated in FIG. 2, includes a constant current source, switches SW_A for applying a current supplied from the constant current source to the X and Y electrodes of the touch panel 101, a comparator 107 that compares a voltage VINT of the capacity detection electrode during current integration with a reference voltage VREF, and switches SW_B for resetting a voltage of the capacity detection electrode. The switches SW_A and SW_B connected to the X electrodes XP and control signals thereof are denoted by SW_XPA and SW_XPB, respectively, and the switches SW_A and SW_B connected to the Y electrodes YP and control signals thereof are denoted by SW_YPA and SW_YPB, respectively.

Figure 3:
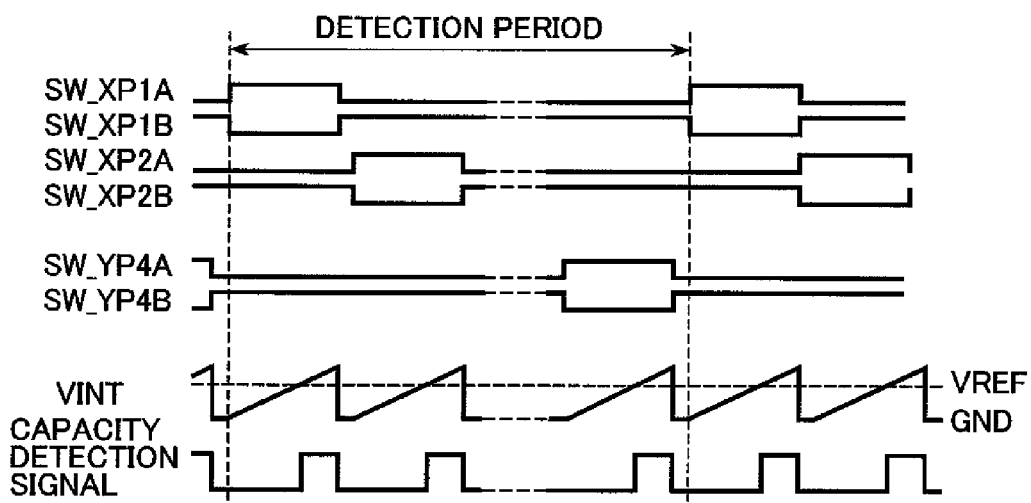
FIG. 3 is a timing chart illustrating an operation of the capacity detection unit.
Figure 4:
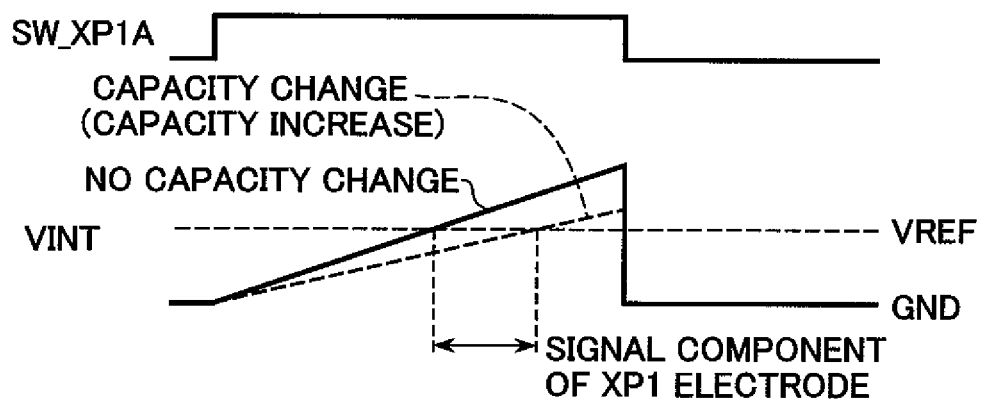
FIG. 4 illustrates a voltage waveform of a capacity detection electrode during capacity detection.

FIG. 3 is a timing chart illustrating an operation of the capacity detection unit 102 illustrated in FIG. 2. It is assumed that the switch is connected when a control signal is at a high level, and disconnected when the control signal is at a low level. The capacity detection unit 102 releases a reset state by setting the SW_XP1B to a low level, and interconnects the constant current source and the electrode XP1 by setting the SW_XP1A to a high level. The voltage VINT of the capacity detection electrode XP1 of the touch panel 101 accordingly increases. The reference voltage VREF is set to a potential higher than a reset potential (here, assumed to be GND). Thus, an output of the comparator 107 is kept at a low level in a period from when the SW_XP1A becomes a high level to when the VINT reaches the VREF. When the VINT reaches the reference voltage VREF or higher, the comparator 107 outputs a high-level signal. Then, the comparator 107 outputs the high-level signal until the SW_XP1A is set in a disconnected state and the SW_XP1B is set in a connected state to reset the electrode XP1. When charging/discharging of the electrode XP1 described above is completed, charging/discharging of the electrode XP2 is similarly carried out. This operation is repeated to detect capacities of the electrodes XP1 to XP4 and YP1 to YP4. Repeating the operation described above enables continuous detection of input coordinates. FIG. 4 illustrates the voltage VINT of the electrode XP1 in a case where the capacity detection using current integration illustrated in FIGS. 2 and 3 changes a capacity of the capacity detection electrode of the touch panel 101. If there is no touch above the electrode XP1 of the touch panel 101, no change occurs in capacity of the electrode XP1, and thus a time period to reach the reference voltage VREF is substantially constant among detection operations. On the other hand, if there is touch above the electrode XP1, a change occurs in capacity of the electrode XP1. For example, assuming that the capacity increases, a time period to reach the reference voltage VREF is longer because a current supplied from the constant current source is constant. The control calculation unit 103 may detect a difference in time period to reach the reference voltage VREF due to touch situations as a difference in rising timing of capacity detection signals. Thus, the control calculation unit 103 may calculate the difference in rising timing of the capacity detection signals as a signal component of each electrode, and calculate input coordinates from the signal component of each electrode.

Figure 5A:
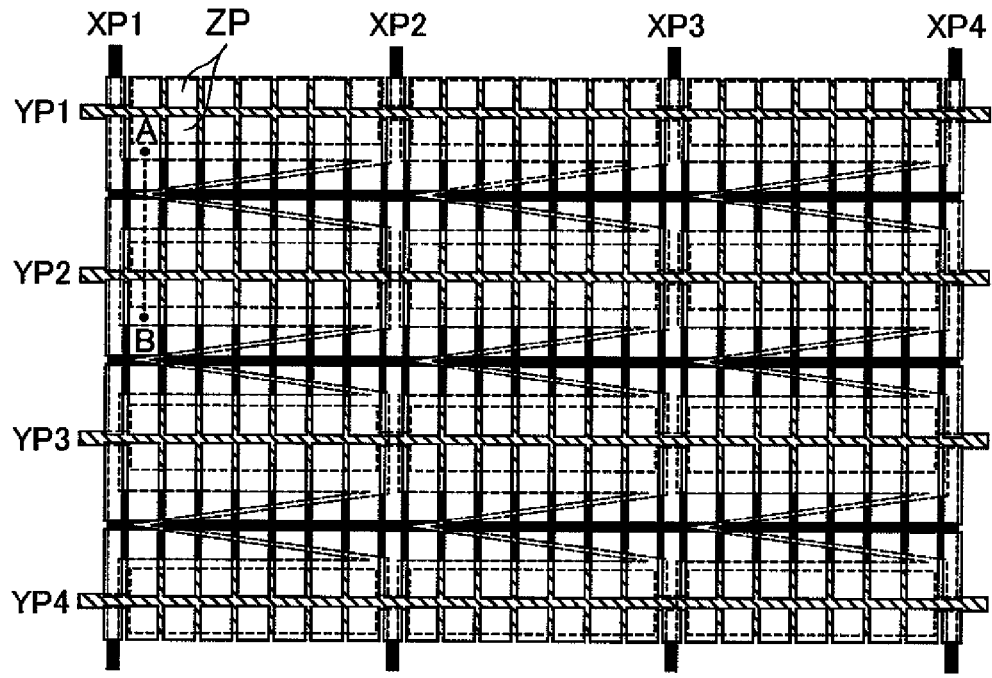
FIG. 5A is a plan view illustrating an electrode shape of a touch panel according to the first embodiment of the present invention.
Figure 5B:
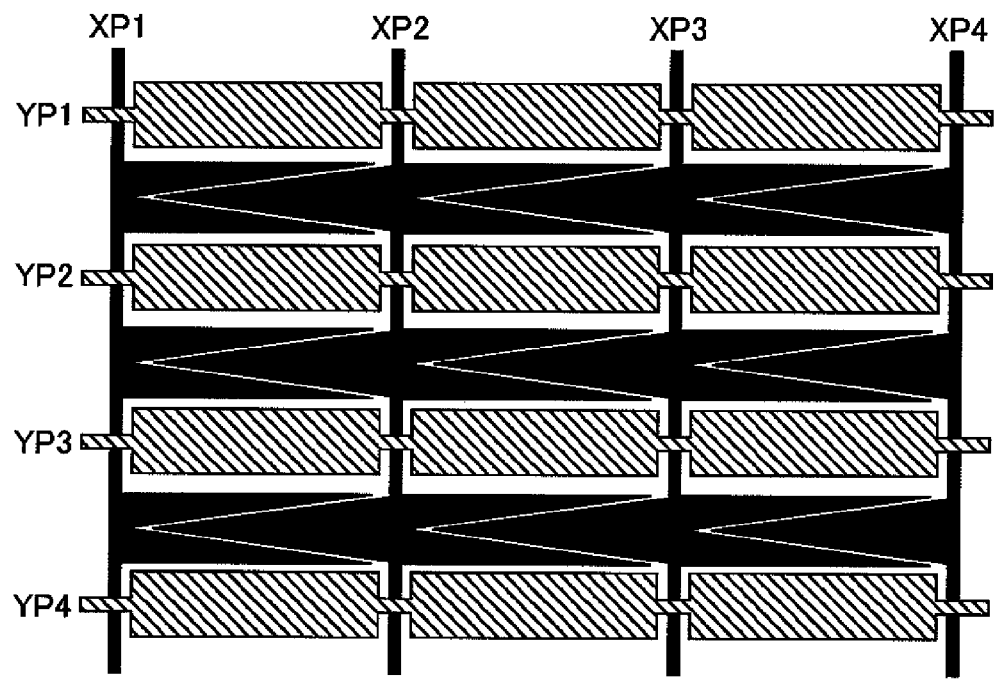
FIG. 5B is another plan view illustrating the electrode shape of the touch panel according to the first embodiment of the present invention.
Figure 6:
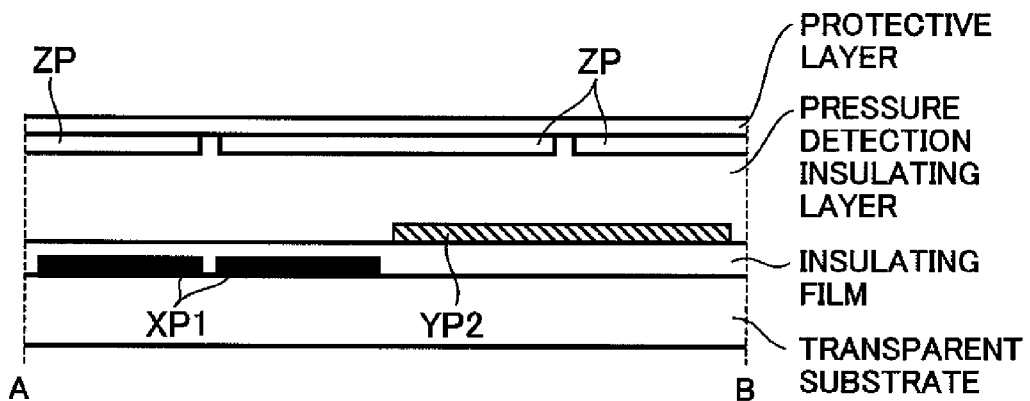
FIG. 6 is a sectional view illustrating an electrode structure of the touch panel according to the first embodiment of the present invention.

Next, referring to FIGS. 5A and 5B and 6, the capacity detection electrodes disposed in the touch panel 101 according to the first embodiment of the present invention are described.

FIG. 5A illustrates electrode patterns of the capacity detection X and Y electrodes XP and YP of the touch panel 101, and Z electrodes ZP disposed thereabove. The X and Y electrodes XP and YP are connected to the capacity detection unit 102 via detection wiring lines. On the other hand, the Z electrodes ZP are not electrically connected but are provided in a floating state. FIG. 5B illustrates only the electrode patterns of the X and Y electrodes XP and YP. The Y electrode extends in a horizontal direction of the touch panel 101, and a plurality of the Y electrodes are arranged in a vertical direction thereof. At an intersection portion between the Y and X electrodes, widths of the Y and X electrodes are formed into small to reduce an intersection capacity of each electrode. Herein, this portion is referred to as a thin line part. Thus, the Y electrode has a shape in which thin line parts and other electrode parts (hereinafter, referred to as pad parts) are alternately arranged in an extending direction of the Y electrode. On the other hand, the X electrode extends in a vertical direction of the touch panel 101, and a plurality of the X electrodes are arranged in a horizontal direction thereof. As in the case of the Y electrode, the X electrode has a shape in which thin line parts and pad parts are alternately arranged in the extending direction of the X electrode. The pad part of the X electrode is formed between the adjacent Y electrodes. In the following description regarding a shape of the pad part of the X electrode, it is herein assumed that a wiring line position (or thin line part of the X electrode) for connecting the X electrode to the detection wiring line is a horizontal center of the X electrode. The electrode shape of the pad part of the X electrode is smaller in area as approaching to the center of the adjacent X electrode, and larger as approaching to the center of the X electrode. Thus, regarding an area of the X electrode between the two adjacent X electrodes such as the electrodes XP1 and XP2, an electrode area of the pad part of the electrode XP1 is largest, and an electrode area of the pad part of the electrode XP2 is smallest near the center of the electrode XP1. On the other hand, an electrode area of the pad part of the electrode XP1 is smallest, and an electrode area of the pad part of the electrode XP2 is largest near the center of the electrode XP2. In a pad part shape between the two adjacent X electrodes, a shape of one X electrode is convex, while a shape of another X electrode is concave.

In FIG. 5B, an electrode shape of the pad part on the left side of the X electrode is convex, and an electrode shape on the right side thereof is concave. However, shapes are not limited thereto. For example, an electrode shape on the right side of the X electrode may be convex, and an electrode shape on the left side thereof may be concave. Alternatively, electrode shapes on the left and right sides of the X electrode may be convex, and an electrode shape of the adjacent X electrode may be concave.

A shape of the Z electrode ZP is described below. In FIG. 5A, the Z electrode ZP is divided into a plurality of electrodes ZP by a plurality of slits parallel to the Y electrode and a plurality of slits parallel to the X electrode. In FIG. 5A, vertical positions of the slits parallel to the Y electrode are set above the X and Y electrodes. The vertical position of the slit above each X electrode is preferably set near an apex of the convex shape of the X electrode, or near a valley of the concave shape thereof. The vertical position of the slit above each Y electrode is preferably set near a center of a width of the Y electrode. On the other hand, the plurality of slits parallel to the X electrode are formed between the adjacent X electrodes. In this case, an interval of the slits parallel to the X electrode may be set arbitrarily. Preferably, however, the interval is set approximately to an assumed size of a minimum contact surface of input means. It should be noted that, in FIG. 5A, the slit parallel to the Y electrode is formed above each X electrode and each Y electrode, but the slit may be formed above at least one of each X electrode and each Y electrode.

FIG. 6 illustrates a sectional shape of the touch panel 101 taken from points A to B of FIG. 5A. This sectional view illustrates only layers necessary for describing a touch panel operation. Each electrode of the touch panel 101 is formed on a transparent substrate. Descriptions are made of layers in an order from nearer to farther from the transparent substrate. First, the X electrode XP is formed in a place near the transparent substrate, and an insulating film is then formed so as to insulate the X electrode from the Y electrode. Then, the Y electrode YP is formed. The order of the X and Y electrodes XP and YP may be reversed. After the formation of the Y electrode YP, a pressure detection insulating layer is formed, and the Z electrode ZP and a protective layer are formed. The pressure detection insulating layer may be made of any transparent insulating material as long as a film thickness thereof changes when pressed by a touch operation. For example, the pressure detection insulating layer may be formed by using an elastic insulating material.

Next, referring to FIGS. 7A and 7B and 8A and 8B, a capacity change during a touch operation in the touch panel 101 according to the first embodiment of the present invention is described.

Figure 7A:
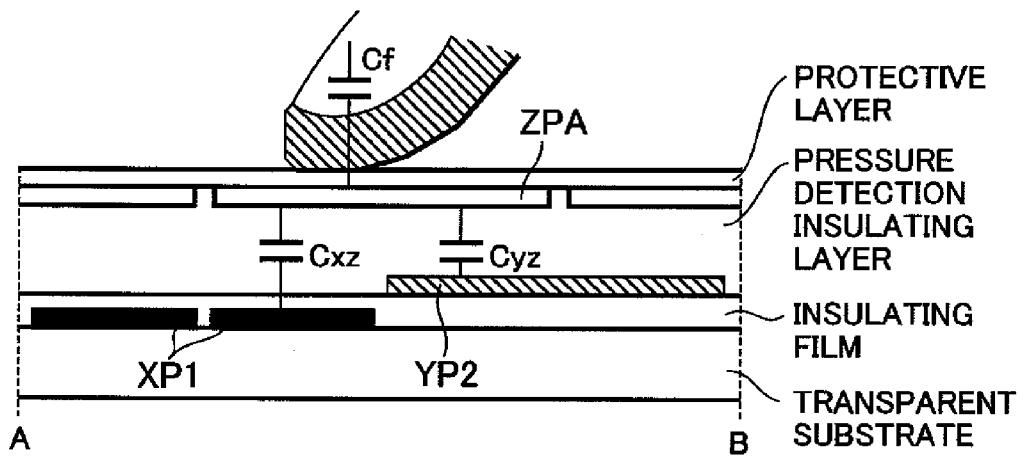
FIG. 7A is a schematic view illustrating a capacity change caused on an electrostatic capacity of the capacity detection electrode in the touch panel according to the first embodiment of the present invention.
Figure 7B:
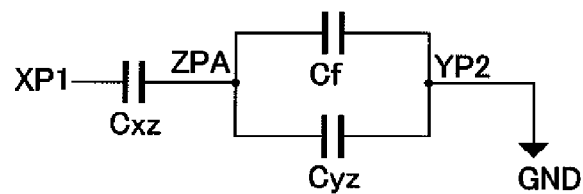
FIG. 7B is another schematic view illustrating the capacity change caused on the electrostatic capacity of the capacity detection electrode in the touch panel according to the first embodiment of the present invention.

FIGS. 7A and 7B are schematic views each illustrating a capacity change in a case where the input means for the touch operation is a conductor such as a finger. It is assumed that pressing during the touch operation is too small to change a thickness of the pressure detection insulating layer. An electrode capacity of each electrode is a capacity combining a fringe capacity and an intersection capacity with an adjacent electrode, and other parasitic capacity. In this case, it is assumed that attention is focused on only a parallel plate capacity with the Z electrode, and no change occurs in other electrode capacities during a touch operation and during no touch operation. A capacity between the Z electrode ZPA and the X electrode XP1 is Cxz, and a capacity between the Z electrode ZPA and the Y electrode YP2 is Cyz when there is no touch operation.

When the capacity detection unit 102 detects an electrode capacity of the X electrode XP1, the Y electrode YP2 is set to a reset state and has the GND potential. Thus, in the case of the X electrode XP1, a combined capacity is a serially connected capacity of the capacities Cxz and Cyz because the Z electrode ZPA is in a floating state. In this case, a combined capacity Cxp of the X electrode is represented by the following expression.

$$Cxp = Cxz \cdot Cyz / (Cxz + Cyz) \quad (1)$$

When there is finger touch by a touch operation, an electrostatic capacity component Cf is electrically connected to the Z electrode ZPA. An equivalent circuit of the combined capacity in this case is as illustrated in FIG. 7B, and a combined capacity Cxpf of the X electrode during the touch operation is represented by the following expression.

$$Cxpf=Cxz \cdot (Cyz+Cf)/(Cxz+Cyz+Cf) \quad (2)$$

The control calculation unit 103 calculates a difference between the capacity Cxp of the electrode XP1 in the case where no touch operation is performed and the capacity Cxpf of the electrode XP1 in the case where the touch operation is performed as a signal component of the electrode XP1. A difference ΔCxp between electrode capacities based on presence/absence of the touch operation may be calculated based on the expressions (1) and (2).

$$\Delta Cxp = Cxz^2 \cdot Cf / \{(Cxz+Cyz)(Cxz+Cyz+Cf)\} \quad (3)$$

As may be confirmed from the expression (3), the difference ΔCxp between the electrode capacities may be calculated as a signal component of the electrode XP1 by the control calculation unit 103 because the difference ΔCxp depends on the electrostatic capacity component Cf.

Figure 8A:
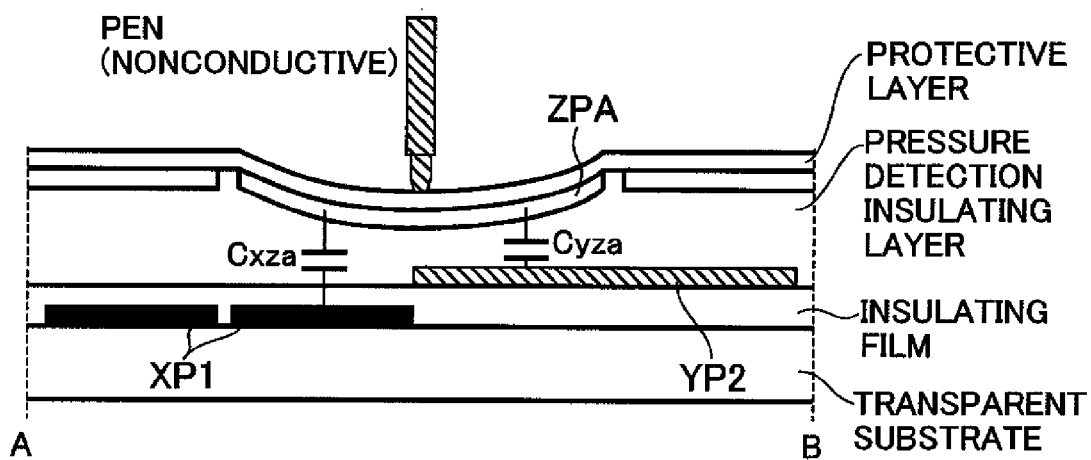
FIG. 8A is a schematic view illustrating a capacity change caused by a thickness change of a pressure detection insulating layer of the capacity detection electrode in the touch panel according to the first embodiment of the present invention.
Figure 8B:
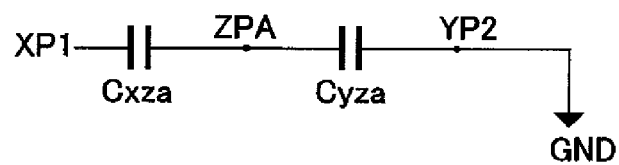
FIG. 8B is another schematic view illustrating the capacity change caused by the thickness change of the pressure detection insulating layer of the capacity detection electrode in the touch panel according to the first embodiment of the present invention.

FIGS. 8A and 8B are schematic views each illustrating a capacity change in a case where the input means for the touch operation is nonconductive and pressing during the touch operation changes the thickness of the pressure detection insulating layer. A capacity of the electrode XP1 in the case where no touch operation is performed may be represented by the expression (1) as described above referring to FIGS. 7A and 7B. Each of FIGS. 8A and 8B illustrates a case where pressing during the touch operation causes the pressure detection insulating layer between the Z electrode ZPA and the capacity detection electrode to be thin. In this case, the following expression is established because a parallel plate capacity is inversely proportional to a thickness, where Cxza denotes a capacity between the Z electrode ZPA and the X electrode XP1 and Cyza denotes a capacity between the Z electrode ZPA and the Y electrode YP2.

$$Cxza > Cxz, Cyza > Cyz \quad (4)$$

When the capacity detection unit 102 detects an electrode capacity of the X electrode XP1, the Y electrode YP2 is set to a reset state and has the GND potential. Thus, in the case of the X electrode XP1, a combined capacity is a serially connected capacity of the capacities Cxza and Cyza because the Z electrode ZPA is in a floating state. In this case, a combined capacity Cxpa of the X electrode is represented by the following expression.

$$Cxpa = Cxza \cdot Cyza / (Cxza+Cyza) \quad (5)$$

The control calculation unit 103 calculates a difference between the capacity Cxp of the electrode XP1 in the case where no touch operation is performed and the capacity Cxpa of the electrode XP1 in the case where the touch operation is performed as a signal component of the electrode XP1. A difference ΔCxpa between electrode capacities based on presence/absence of the touch operation may be calculated based on the expressions (1) and (5).

$$\Delta Cxpa = \{Cxz \cdot Cxza(Cyza-Cyz) + Cyz \cdot Cyza(Cxza-Cxz)\} / \{(Cxz+Cyz)(Cxza+Cyza)\} \quad (6)$$

As may be confirmed from the expressions (4) and (6), the difference ΔCxpa between the electrode capacities may be calculated as a signal component of the electrode XP1 by the control calculation unit 103 because the difference ΔCxpa may be detected by the capacity detection unit 102.

As described above, even in the case of the nonconductive input means, using the pressure detection insulating layer and the Z electrode ZP enables detection of input coordinates based on a capacity change caused by a change in thickness of the pressure detection insulating layer by pressing.

Next, referring to FIGS. 9A to 9D and 10, a signal component of each electrode in a case where a position of a contact surface is horizontally shifted when the contact surface by the touch operation is small is described.

Figure 9A:
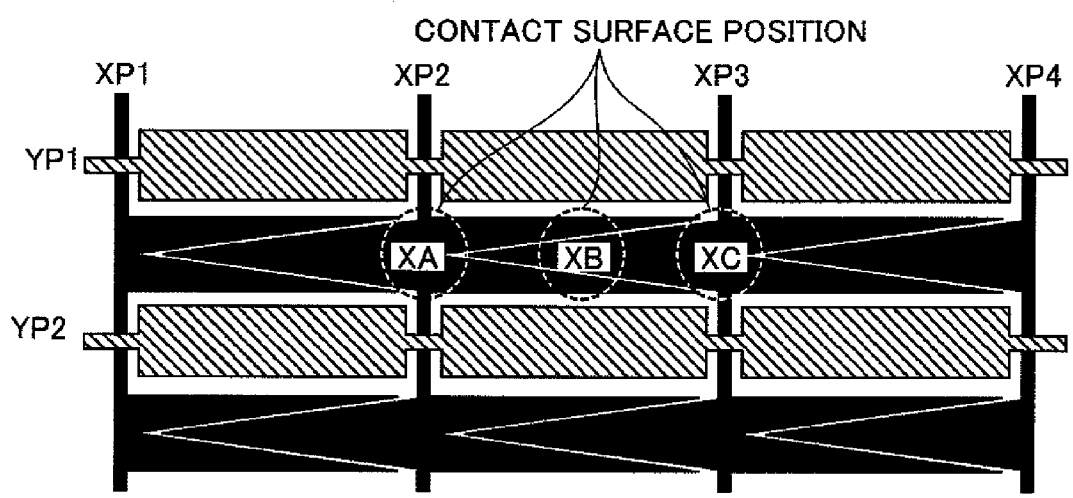
FIG. 9A illustrates a situation in which a position of a contact surface is shifted in an X direction above an X electrode according to the first embodiment of the present invention.
Figure 9B:
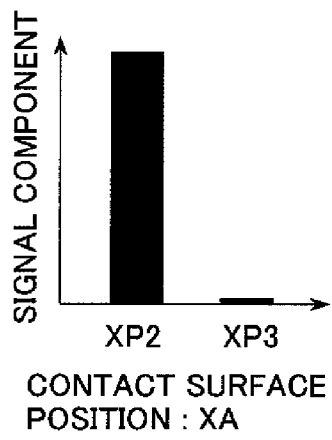
FIG. 9B is a graph illustrating a signal component in a case where the contact surface moves in the X direction according to the first embodiment of the present invention.
Figure 9C:
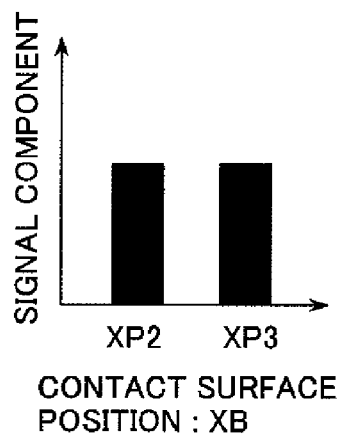
FIG. 9C is another graph illustrating the signal component in the case where the contact surface moves in the X direction according to the first embodiment of the present invention.
Figure 9D:
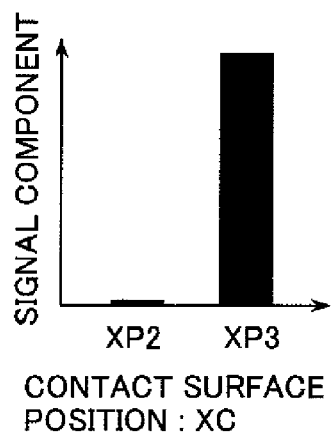
FIG. 9D is still another graph illustrating the signal component in the case where the contact surface moves in the X direction according to the first embodiment of the present invention.

FIG. 9A illustrates a situation in which the position of the contact surface is shifted above the X electrode between the two adjacent X electrodes XP2 and XP3. XA is near a center of the electrode XP2, XB is near an intermediate position between the electrodes XP2 and XP3, and XC is near a center of the electrode XP3. FIG. 9A illustrates no Z electrode ZP for simplicity. FIG. 9B illustrates signal components of the electrodes XP2 and XP3, which are calculated by the control calculation unit 103, in a case where the position of the contact surface is XA. Similarly, FIG. 9C illustrates signal components of the electrodes XP2 and XP3 in a case where the position of the contact surface is XB, and FIG. 9D illustrates signal components of the electrodes XP2 and XP3 in a case where the position of the contact surface is XC. The electrostatic capacity component Cf, which has been described referring to FIGS. 8A and 8B, and the capacity change between the Z electrode ZP and the capacity detection electrode, which has been described referring to FIGS. 9A to 9D, depend on an area of the contact surface. Thus, a signal component is large when an overlapped area between the capacity detection electrode and the contact surface is large, and is small conversely when the overlapped area between the capacity detection electrode and the contact surface is small. At the position XA, an overlapped area is large between the contact surface and the electrode XP2, while there is almost no overlapping with the electrode XP3. Thus, as illustrated in FIG. 9B, a signal component of the electrode XP2 is large while a signal component of the electrode XP3 is small. At the position XB, overlapped areas between the electrodes XP2 and XP3 and the contact surface are substantially equal. Thus, as illustrated in FIG. 9C, calculated signal components are substantially equal between the electrodes XP2 and XP3. At the position XC, an overlapped area is large between the contact surface and the electrode XP3, while there is almost no overlapping with the electrode XP2. Thus, as illustrated in FIG. 9D, a signal component of the electrode XP3 is large, while a signal component of the electrode XP2 is small. The control calculation unit 103 calculates input coordinates of the contact surface contacted through the touch operation by performing gravity center calculation using a signal component of each electrode. When substantially equal signal components of the electrodes XP2 and XP3 are obtained as illustrated in FIG. 9C, a gravity center position comes between the electrodes XP2 and XP3, and input coordinates may accordingly be calculated. On the other hand, if a signal component of one of the X electrodes is significantly large as illustrated in FIG. 9B or 9D, a gravity center position is near the X electrode having the large detected signal component, and accordingly input coordinates may similarly be calculated.

Figure 10:
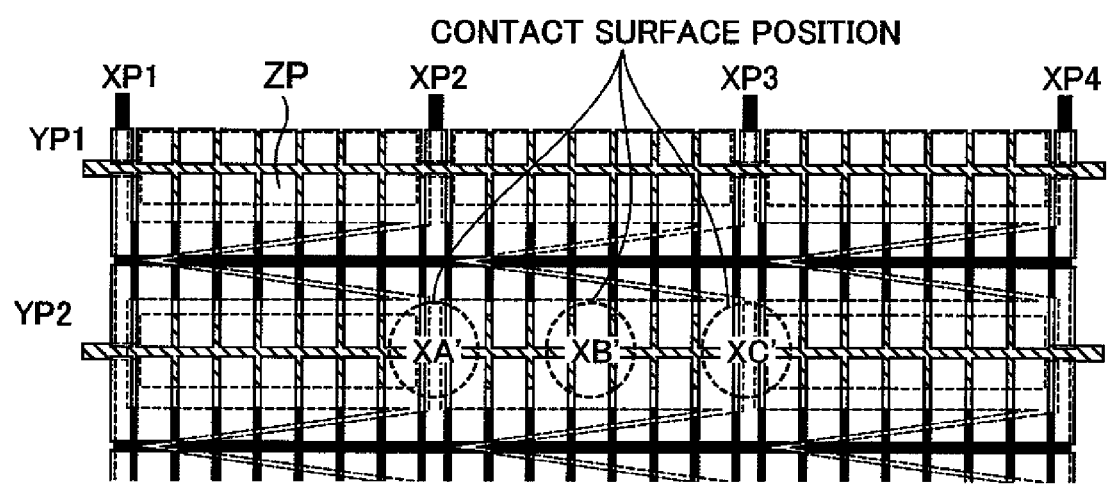
FIG. 10 is a schematic view in a case where the contact surface exists above a Y electrode and moves in the X direction according to the first embodiment of the present invention.

FIG. 10 illustrates a situation in which the contact surface is shifted above the Y electrode as in the case of FIG. 9A. For horizontal positions, XA, XB and XC of FIG. 9A respectively correspond to XA', XB', and XC'. In FIG. 10, while the contact surface does not directly overlap the X electrode, the Z electrode ZP overlapping the contact surface overlaps the adjacent X electrodes XP2 and XP3. Thus, a capacity change caused by contact above the Y electrode may be detected also at the adjacent X electrode by capacity coupling via the Z electrode ZP.

As described above, using the electrode shape of the X electrode according to the first embodiment of the present invention enables gravity center calculation even when an interval between the X electrodes is larger as compared with the contact surface, whereby a position of the contact surface may be detected with high accuracy. Thus, the number of electrodes may further be reduced compared with the conventional electrode patterns by widening the interval between the X electrodes as compared with the contact surface. Moreover, even when the electrode shape of the X electrodes is discrete by interposing the Y electrode, by disposing the Z electrode in an electrically floating state over the X and Y electrodes adjacent to each other, input coordinates in the X direction may be detected on the entire touch panel.

Next, referring to FIGS. 11A to 11D, a signal component of each electrode in a case where a position of the contact surface is vertically shifted when the contact surface by the touch operation is small is described.

Figure 11A:
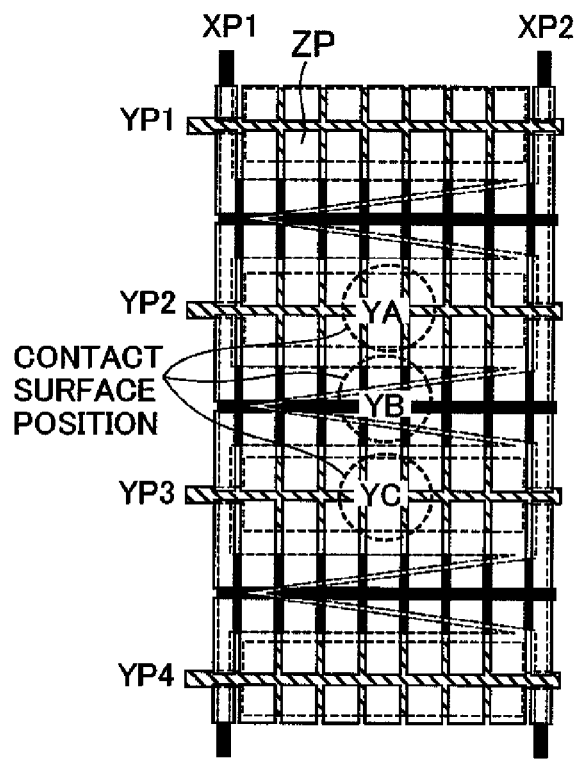
FIG. 11A illustrates a situation in which the position of the contact surface is shifted in a Y direction according to the first embodiment of the present invention.
Figure 11B:
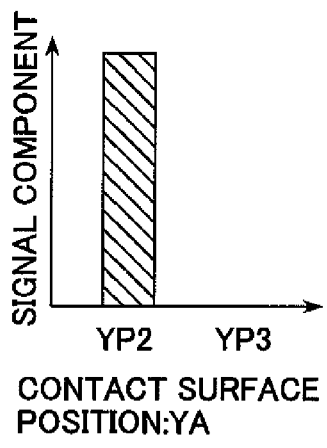
FIG. 11B is a graph illustrating a signal component in a case where the contact surface moves in the Y direction according to the first embodiment of the present invention.
Figure 11C:
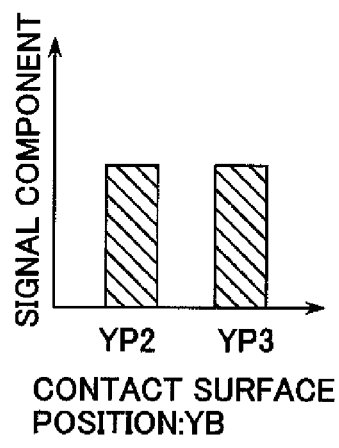
FIG. 11C is another graph illustrating the signal component in the case where the contact surface moves in the Y direction according to the first embodiment of the present invention.
Figure 11D:
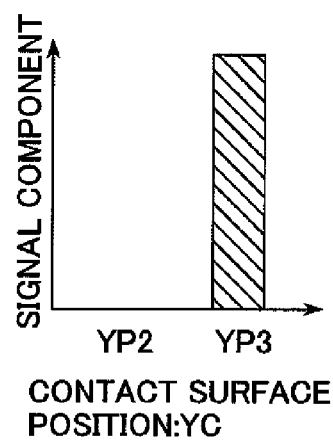
FIG. 11D is still another graph illustrating the signal component in the case where the contact surface moves in the Y direction according to the first embodiment of the present invention.

FIG. 11A illustrates a situation in which the position of the contact surface is shifted in a vertical direction between the two adjacent Y electrodes YP2 and YP3. YA is near a center of the electrode YP2, YB is near an intermediate position between the electrodes YP2 and YP3, and YC is near a center of the electrode YP3. It is only the Y electrode YP2 that overlaps the contact surface when the contact surface is at the position YA. Thus, a signal component detected by the control calculation unit 103 is only a signal component of the electrode YP2 as illustrated in FIG. 11B. Similarly, it is only the Y electrode YP3 that overlaps the contact surface when the contact surface is at the position YC. Thus, only a signal component of the electrode YP3 is detected by the control calculation unit 103 as illustrated in FIG. 11D. On the other hand, when the contact surface is above the X electrode as in the case of the position YB, the Z electrode ZP overlapping the contact surface intersects the adjacent Y electrodes. Thus, a capacity change caused by contact above the X electrode may be detected at the adjacent Y electrodes by capacity coupling via the Z electrode ZP. In the case of the position YB, a capacity change generated in the Z electrode ZP intersecting the electrode YP2 is substantially equal to a capacity change generated in the Z electrode ZP intersecting the electrode YP3. Thus, as illustrated in FIG. 11C, signal components obtained at the electrodes YP2 and YP3 are substantially equal to each other. As in the case of the input coordinate calculation for the X electrode, the control calculation unit 103 performs gravity center calculation using a signal component of each electrode to calculate input coordinates of the contact surface contacted through the touch operation. When signal components of substantially equal levels are obtained at the electrodes YP2 and YP3 as illustrated in FIG. 11C, the control calculation unit 103 may calculate input coordinates because a gravity center position is between the electrodes YP2 and YP3. On the other hand, when only a signal component of one of the Y electrodes is obtained as illustrated in FIG. 11B or 11D, the control calculation unit 103 may similarly calculate input coordinates because a gravity center position is near a center of the Y electrode having the detected signal component.

As described above, even when the electrode shape of the Y electrodes according to the first embodiment of the present invention is discrete by interposing the X electrode, by disposing the Z electrode in an electrically floating state over the X and Y electrodes adjacent to each other, input coordinates in the Y direction may be detected on the entire touch panel. Further, input coordinates in a vertical direction in a region in which the X electrode exists may be detected by using the above-mentioned Z electrode. Thus, the number of the Y electrodes may be reduced. Moreover, vertical Y coordinates may be calculated based on gravity center calculation, thereby enabling highly accurate detection of a position of the contact surface.

Figure 12:
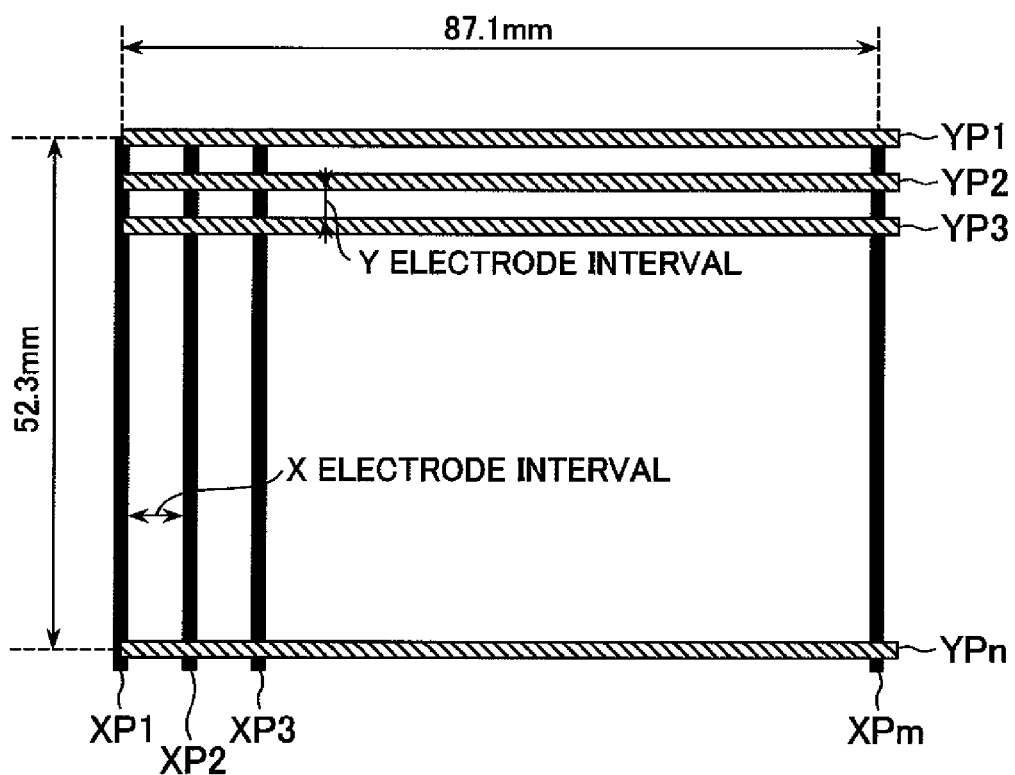
FIG. 12 illustrates an arrangement of the capacity detection electrodes in the touch panel.
Figure 13:
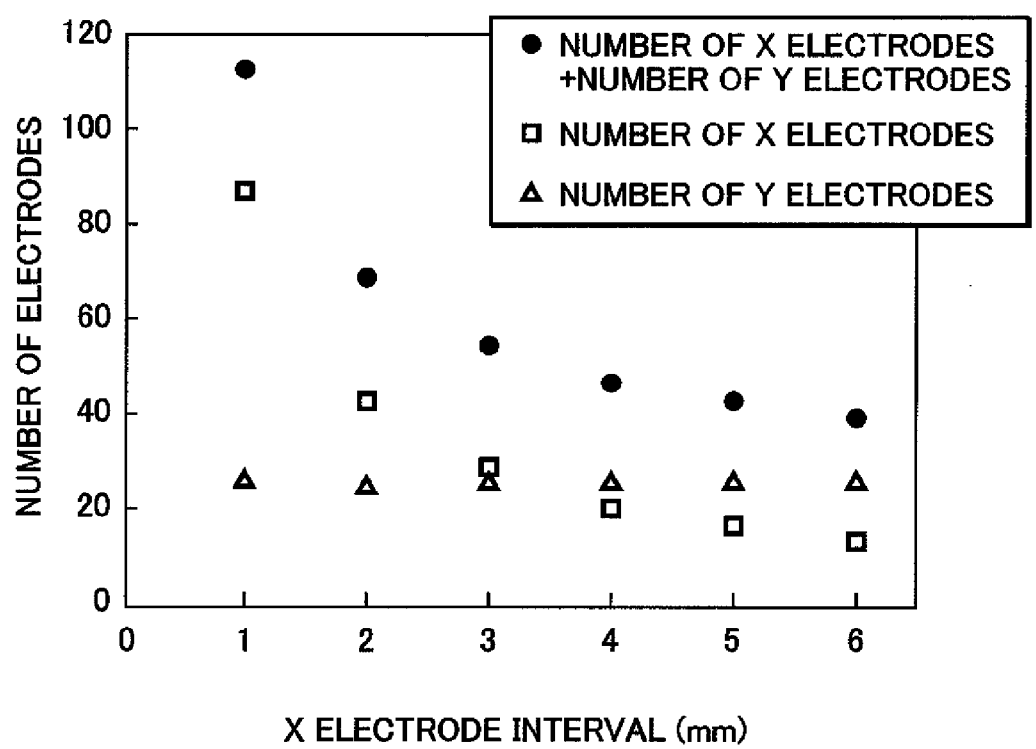
FIG. 13 is a graph illustrating a relationship between the number of the capacity detection electrodes and an X electrode interval.

In order to show the above-mentioned reduction effect of the number of the capacity detection electrodes based on the electrode shapes of the X, Y and Z electrodes according to the first embodiment of the present invention, the number of electrodes is calculated in a touch panel having a diagonal size of 4 inches (vertical and horizontal ratio is 3:4) as illustrated in FIG. 12. A minimum contact surface is assumed to be 1.0 mm in diameter, and an interval between the Y electrodes is assumed to be 2.0 mm. FIG. 13 is a graph illustrating the numbers of electrodes in a case where an interval between the X electrodes is a parameter. Widening the interval between the X electrodes enables reduction in number of the X electrodes. For example, setting the electrode interval to 6.0 mm enables reduction in number of the capacity detection electrodes by about 100 compared with the conventional technology in which the number of electrodes is 139 (X and Y electrodes are both arrayed at intervals of 1.0 mm).

Reducing the number of the capacity detection electrodes according to the first embodiment of the present invention enables reduction in frame size for laying detection wiring lines. Further, the number of connections between the touch panel 101 and the capacity detection unit 102 is reduced, and hence reliability improvement may be expected. Moreover, the number of the capacity detection electrodes is reduced, and hence the number of terminals of the capacity detection unit may also be reduced. Thus, costs to realize IC formation may be reduced.

Figure 14:
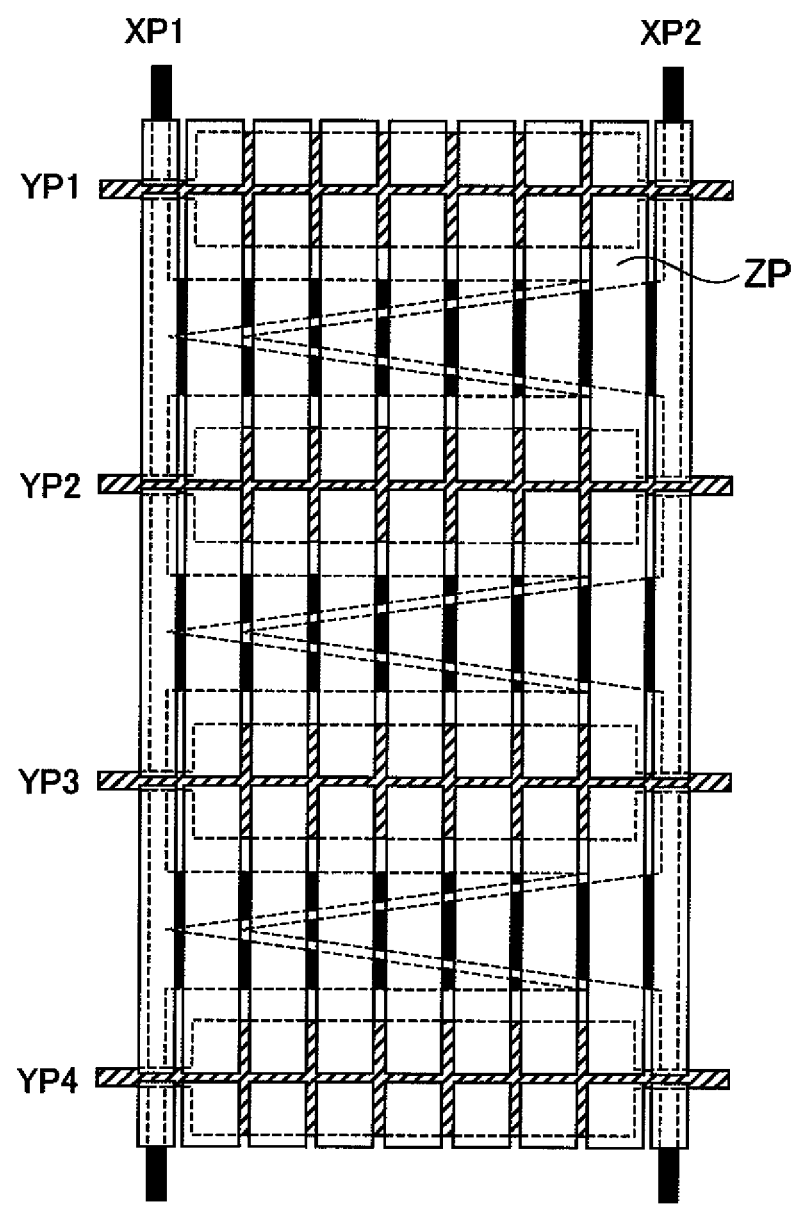
FIG. 14 is a schematic view illustrating another shape of a Z electrode according to the first embodiment of the present invention.
Figure 15:
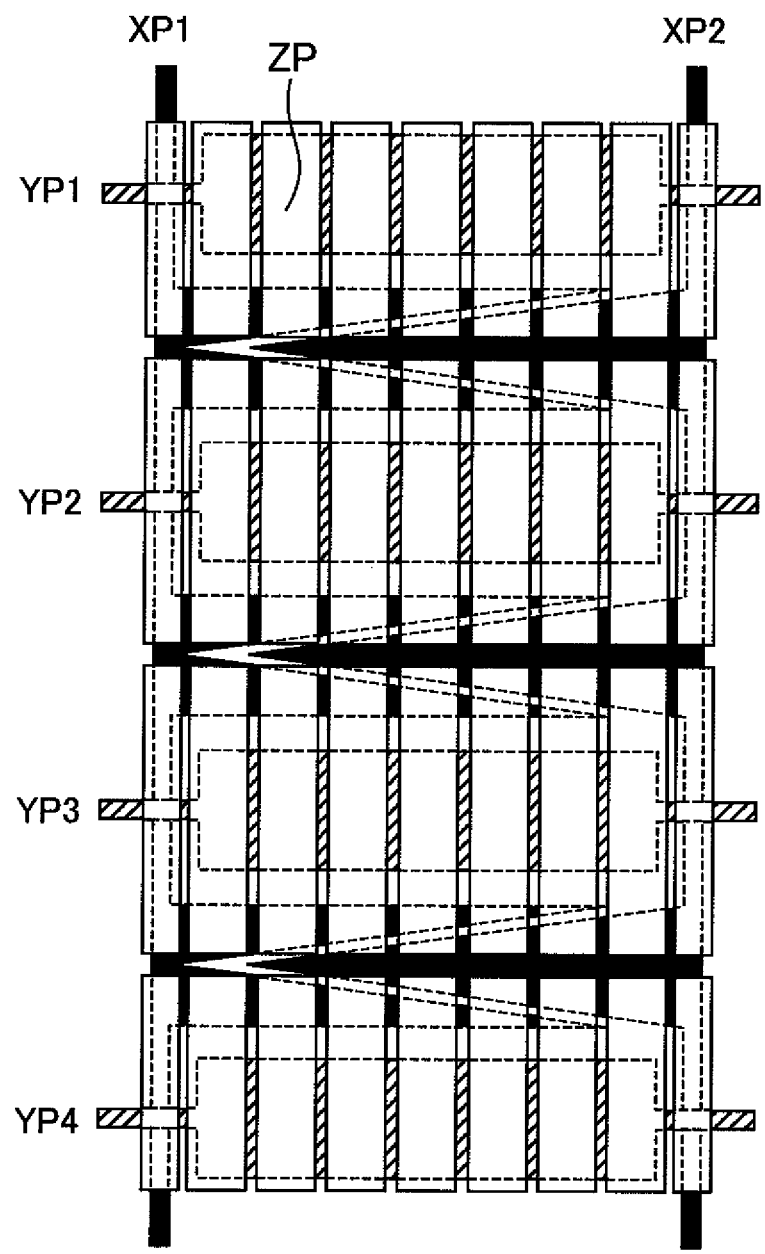
FIG. 15 is a schematic view illustrating still another shape of the Z electrode according to the first embodiment of the present invention.

Each of FIGS. 14 and 15 illustrates a case where the slit position of the Z electrode is changed. In the Z electrodes ZP of FIGS. 5A, 14, and 15, slits parallel to the X electrodes are similar to one another while slits parallel to the Y electrodes are different from one another. However, intersection of the Z electrodes over the X and Y electrodes adjacent to each other is the same.

In FIG. 14, the slit parallel to the Y electrode is formed near a center of each Y electrode. The same Z electrode accordingly intersects over the X and Y electrodes adjacent to each other. Thus, as in the case of FIG. 5A, a capacity change on the X electrode may be detected at the Y electrode by coupling, and a capacity change on the Y electrode may be detected at the X electrode by coupling. As a result, effects similar to those of the case of FIG. 5A may be expected.

In FIG. 15, the slit parallel to the Y electrode is formed near a center of each X electrode. The same Z electrode accordingly intersects over the X and Y electrodes adjacent to each other. Thus, as in the case of FIG. 5A, a capacity change on the X electrode may be detected at the Y electrode by coupling, and a capacity change on the Y electrode may be detected at the X electrode by coupling. As a result, effects similar to those of the case of FIG. 5A may be expected.

Figure 16:
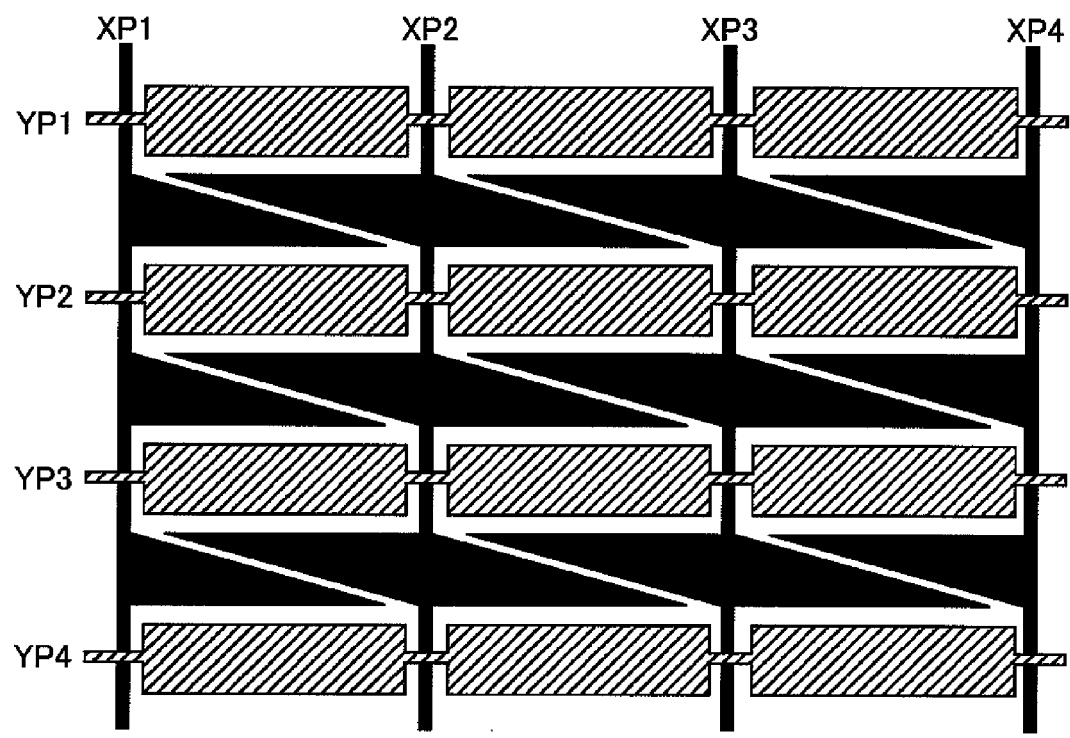
FIG. 16 is a schematic view illustrating another shape of the X electrode according to the first embodiment of the present invention.

FIG. 16 illustrates a case where the shape of the X electrode illustrated in FIG. 5B is changed. In FIGS. 5B and 16, shapes of the Y electrodes are the same. In FIG. 5B, the shape on the right side of the X electrode is concave and the shape on the left side of the X electrode is convex. On the other hand, in FIG. 16, the shapes on both sides of the X electrode are substantially triangular. In both of FIGS. 5B and 16, an area of the X electrode is smaller toward the center of another X electrode adjacent thereto, and is larger toward a center of the X electrode. Thus, effects similar to those of the case of FIG. 5B may be expected. The shapes of the X electrodes are not limited to the shapes of FIGS. 5B and 16. Any shapes may be employed as long as an area is smaller toward the center of another adjacent X electrode thereto while the area is larger toward the center of the X electrode.

As described above, according to the first embodiment of the present invention, even when contact occurs on the touch panel with the use of the nonconductive input means, a capacity change is caused by changing distances between the capacity detection X and Y electrodes and the Z electrode disposed thereabove. Thus, input coordinates may be detected by the electrostatic capacity coupling method. As a result, the resin stylus used for the resistance film method may be dealt with, thereby lowering a replacement barrier with a resistance film type touch panel.

Contriving the electrode shapes so that an input position between the adjacent X electrodes may be calculated based on a signal ratio of capacity changes obtained from the two adjacent X electrodes enables reduction in number of the X electrodes, and contriving the arrangement of the Z electrodes enables reduction in number of the Y electrodes. Thus, a frame width necessary for laying wiring lines from the detection electrodes to the input processing unit may be made smaller, thereby improving designing likelihood. Further, an increase in number of terminals of the input processing unit may be suppressed, and hence an electrostatic capacity coupling type touch panel that enables highly accurate input position detection with low cost may be realized. Moreover, input coordinates may be accurately detected even with the use of input means having a small contact surface, such as a stylus, and hence the present invention may be applied to an application for character input.

Figure 17:
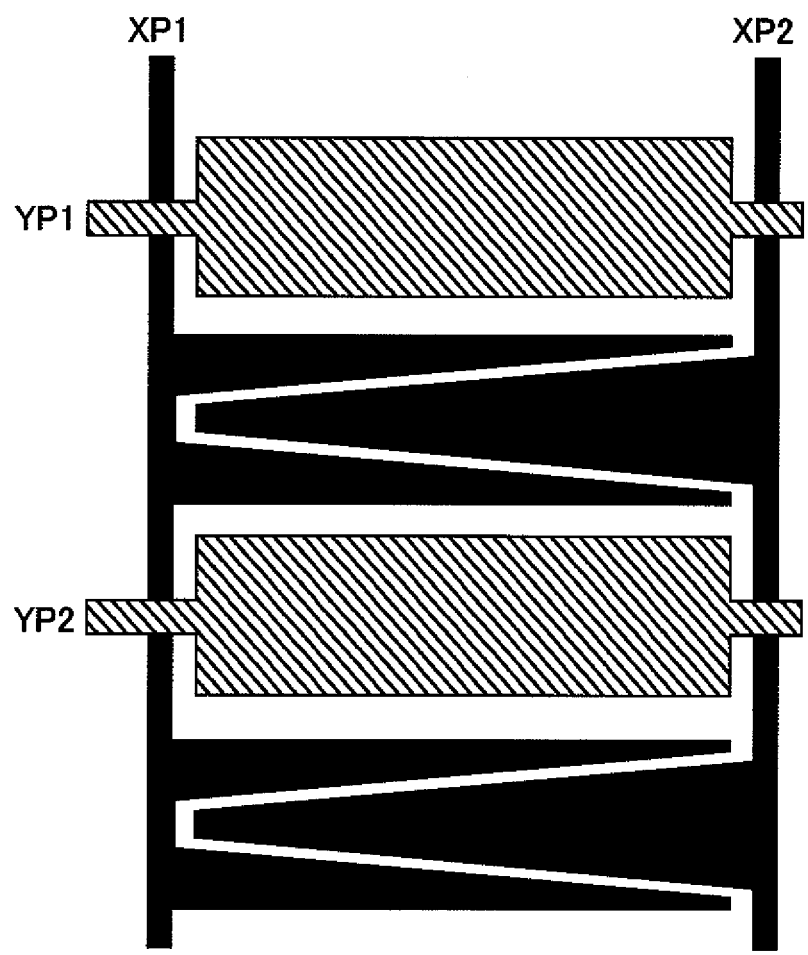
FIG. 17 is a schematic view illustrating still another shape of the X electrode according to the first embodiment of the present invention.

In the above-mentioned touch panel according to the first embodiment of the present invention, the X electrode XP may have a shape with a constant width at an end portion farthest from the center of the X electrode as illustrated in FIG. 17.

Each of FIGS. 18A to 18D illustrates a signal component of each electrode in a case where the position of the contact surface is horizontally shifted when the contact surface by the touch operation is small in the touch panel employing the electrode shape illustrated in FIG. 17.

Figure 18A:
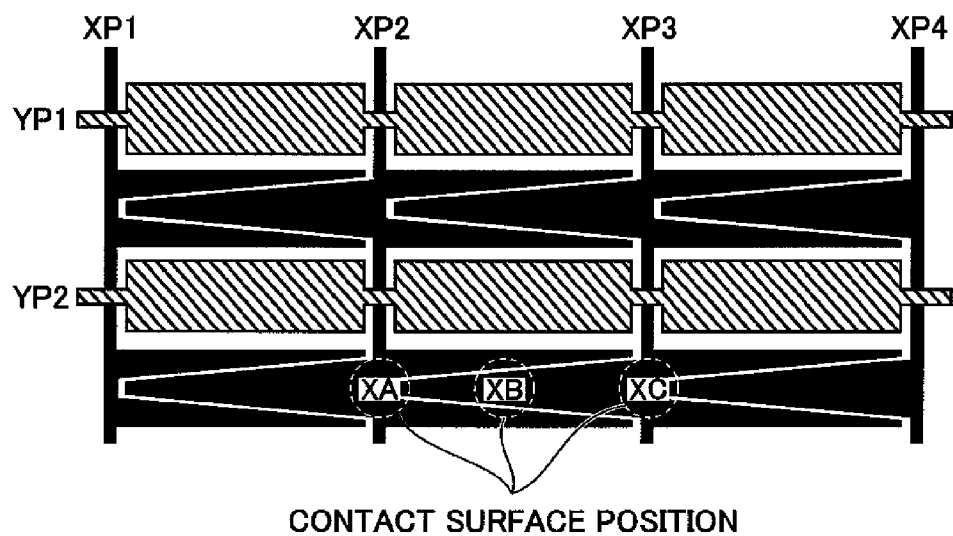
FIG. 18A illustrates a situation in which the position of the contact surface is shifted in the X direction according to the first embodiment of the present invention.
Figure 18B:
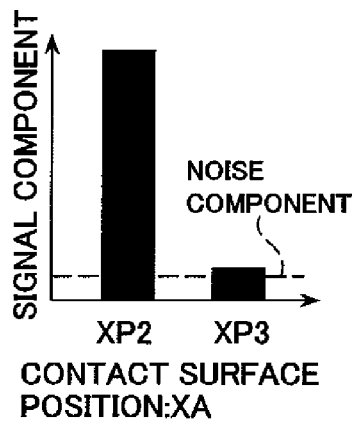
FIG. 18B is a graph illustrating a signal component in the case where the contact surface moves in the X direction according to the first embodiment of the present invention.
Figure 18C:
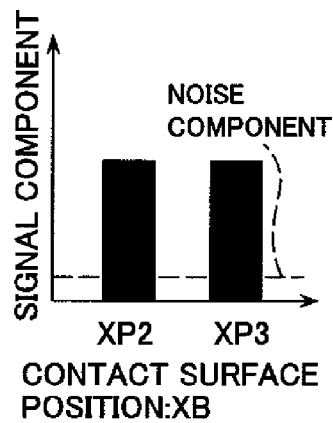
FIG. 18C is another graph illustrating the signal component in the case where the contact surface moves in the X direction according to the first embodiment of the present invention.
Figure 18D:
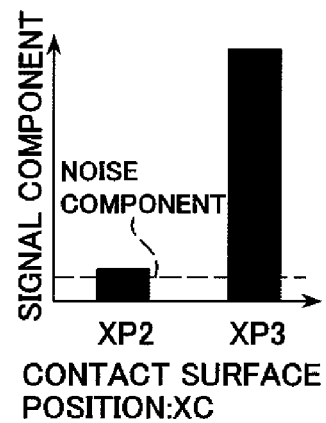
FIG. 18D is still another graph illustrating the signal component in the case where the contact surface moves in the X direction according to the first embodiment of the present invention.

FIG. 18A illustrates a situation in which the position of the contact surface is shifted above the X electrode between the two adjacent X electrodes XP2 and XP3. XA is near the center of the electrode XP2, XB is near the intermediate position between the electrodes XP2 and XP3, and XC is near the center of the electrode XP3. FIG. 18A illustrates no Z electrode ZP for simplicity. FIG. 18B illustrates signal components of the electrodes XP2 and XP3, which are calculated by the control calculation unit 103, in a case where the position of the contact surface is XA. Similarly, FIG. 18C illustrates signal components of the electrodes XP2 and XP3 in a case where the position of the contact surface is XB, and FIG. 18D illustrates signal components of the electrodes XP2 and XP3 in a case where the position of the contact surface is XC. As described above, the capacity change between the Z electrode ZP and the capacity detection electrode depends on an area of the contact surface. Thus, a signal component is large when an overlapped area between the capacity detection electrode and the contact surface is large, and is small conversely when the overlapped area between the capacity detection electrode and the contact surface is small. At the position XA, an overlapped area is large between the contact surface and the electrode XP2. The electrode XP3 has the shape with the constant width even at a far end portion thereof, thereby making it possible to obtain an area overlapping the contact surface. Thus, as illustrated in FIG. 18B, a signal component of the electrode XP2 is large, and a signal component of the electrode XP3 is calculated in accordance with the area overlapping the contact surface. At the position XB, overlapped areas between the electrodes XP2 and XP3 and the contact surface are substantially equal. Thus, as illustrated in FIG. 18C, calculated signal components are substantially equal between the electrodes XP2 and XP3. At the position XC, the relationship between the electrodes XP2 and XP3 is substantially reverse to the relationship therebetween in the case of the position XA. It should be noted that, at the position XC, the relationship between the electrodes XP3 and XP4 is similar to the relationship between the electrodes XP2 and XP3 in the case of the position XA.

Incidentally, there is a case where a noise component is superimposed on a signal component due to an influence of peripheral portions of the display device 106 and the capacity detection unit 102. When the noise component is superimposed thereon, signals lower than the noise components which are indicated by dotted lines of FIGS. 18B to 18D may not be used for gravity center calculation to be performed by the control calculation unit 103. Therefore, in the case where the noise component is large, by forming the end portion farthest from the center of the X electrode to have a shape with an arbitrary width as illustrated in FIG. 17, an area overlapping the contact surface may be obtained to obtain a signal component. As a result, a position of contact may accurately be detected.

The pressure detection insulating layer may be formed of a gas with its volume changing depending on a pressure, such as an air. In that case, a spacer may be disposed between the Z electrode ZP and the X and Y electrodes XP and YP in order to maintain a constant interlayer distance while no contact occurs.

Alternatively, instead of an air, the pressure detection insulating layer may be formed by using a liquid material having a refractive index close to those of materials of electrodes disposed above and below the pressure detection insulating layer. Alternatively, there may be used a resin such as an elastomer, with which an interlayer distance changes depending on a pressure, for the pressure detection insulating layer.

Second Embodiment

Next, a touch panel according to a second embodiment of the present invention is described. The touch panel according to the second embodiment of the present invention is different in shape of the Z electrode from the touch panel according to the first embodiment of the present invention. Hence, components other than the Z electrode are similar to those of the above-mentioned first embodiment of the present invention.

Figure 19:
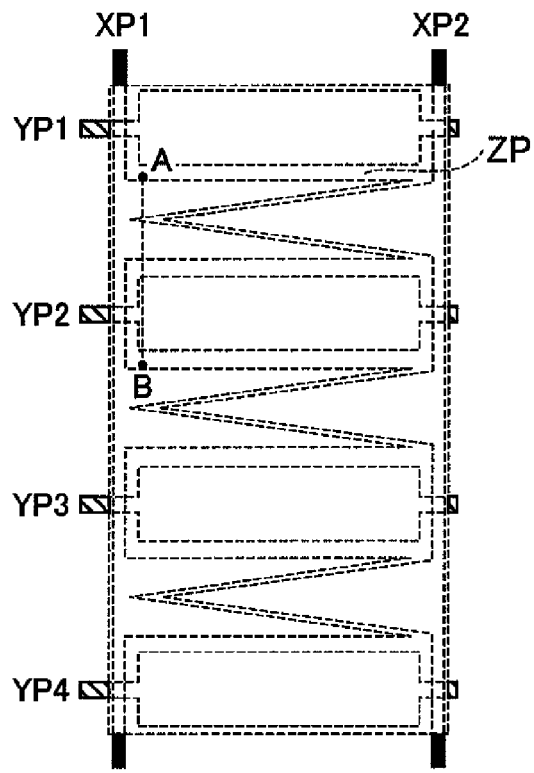
FIG. 19 is a plan view illustrating an electrode shape of a touch panel according to a second embodiment of the present invention.
Figure 20:
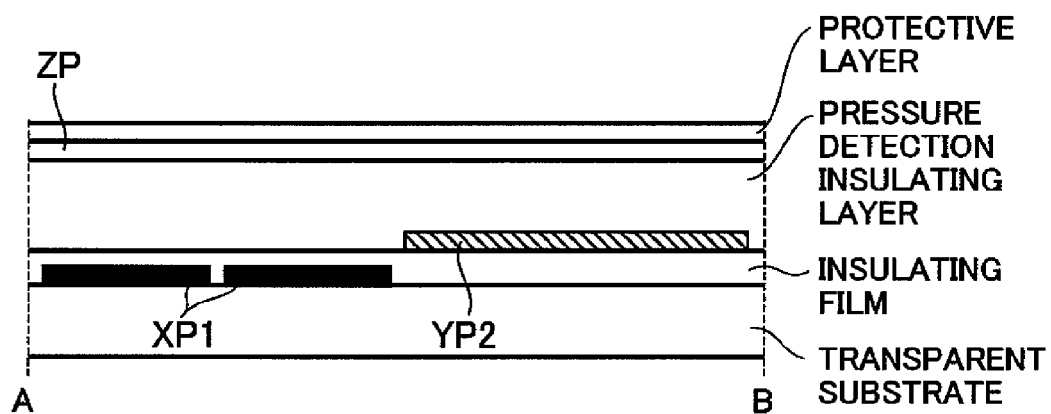
FIG. 20 is a sectional view illustrating an electrode structure of the touch panel according to the second embodiment of the present invention.

Referring to FIGS. 19 and 20, description is made of the shape of the Z electrode included in the touch panel according to the second embodiment of the present invention. As illustrated in FIG. 19, the Z electrode ZP is not divided by a slit, but has a solid electrode shape (shape in which the substantially entire display screen of the touch panel is covered). The Z electrode ZP having the solid electrode shape is also in an electrically floating state. FIG. 20 is a sectional view taken from points A to B in this case. The Z electrode ZP having the solid electrode shape is disposed over the X electrodes XP and the Y electrodes YP by interposing the pressure detection insulating layer.

Figure 21:
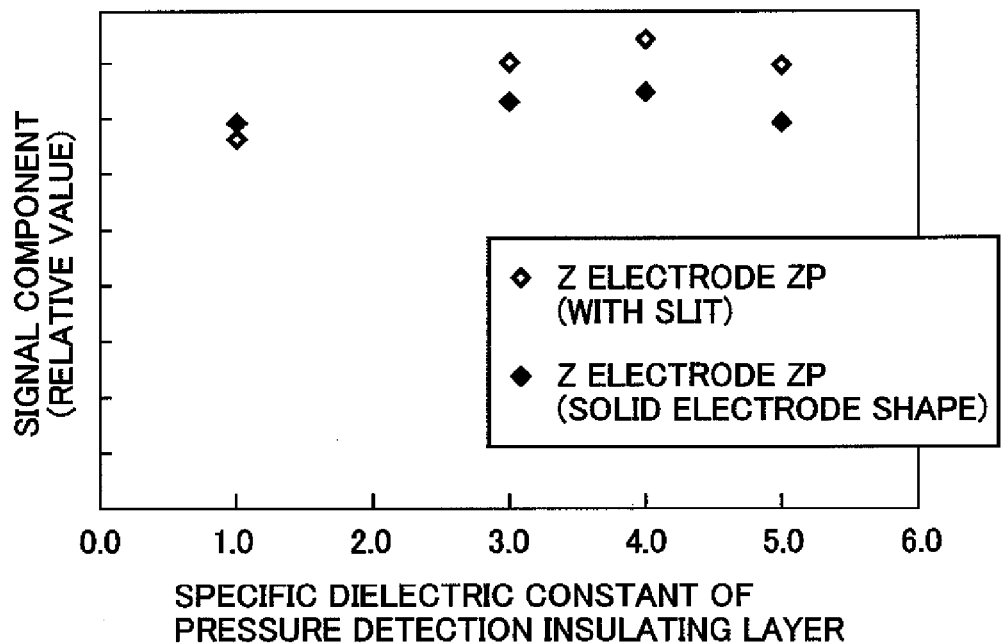
FIG. 21 is a graph illustrating a signal component in a case where a distance of a pressure detection insulating layer of the touch panel changes according to the second embodiment of the present invention.
Figure 22:
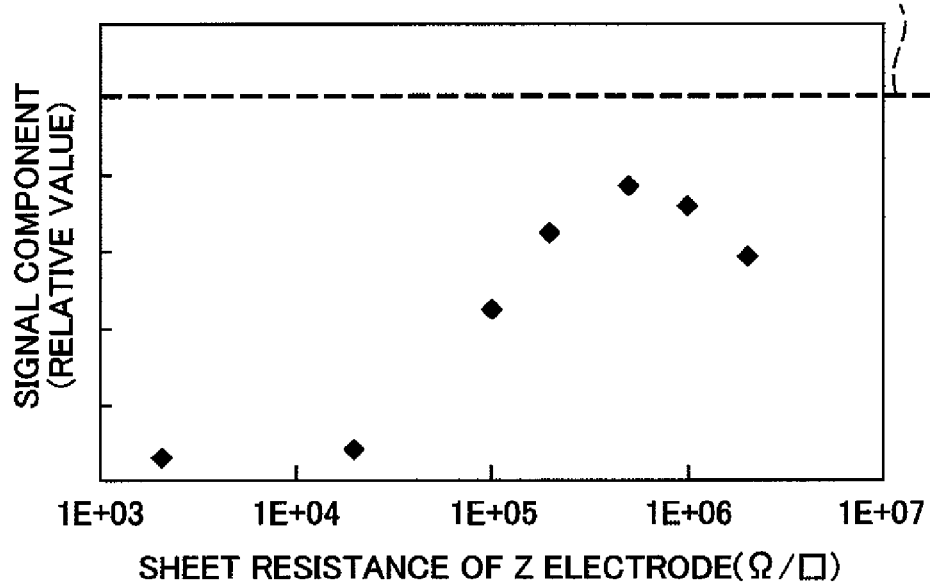
FIG. 22 is a graph illustrating a signal component in a case where a conductor contacts the touch panel according to the second embodiment of the present invention.

FIGS. 21 and 22 show results of simulation calculation of signal components of the X electrode XP serving as the capacity detection electrode in a case where the Z electrode ZP having the solid electrode shape is employed.

FIG. 21 shows results of simulation calculation of signal components in a case where the interlayer distance of the pressure detection insulating layer is changed by pressing the touch panel with a pen or the like. The simulation is performed under the following condition. That is, an interlayer distance of the pressure detection insulating layer before pressing is 70 μm, and an interlayer distance thereof at the time of pressing is 10 μm. The axis of abscissa of the graph represents a specific dielectric constant of the pressure detection insulating layer. For comparison, signal components in the case of the Z electrode ZP with slits according to the first embodiment are represented as well. As illustrated in FIG. 21, it is found that even in the case of the Z electrode ZP having the solid electrode shape, a capacity change caused by the change in interlayer distance of the pressure detection insulating layer, which has been described referring to FIG. 8A, may be detected as a signal component at a degree similar to that in the case of the Z electrode ZP with slits.

FIG. 22 shows results of simulation calculation of signal components in a case where a conductor such as a finger touches the touch panel. Here, it is assumed that a finger or the like lightly touches the touch panel, and hence calculation is performed with the interlayer distance of the pressure detection insulating layer maintained to 70 μm at the time of contact. Further, the specific dielectric constant of the pressure detection insulating layer is 3.8. As data for comparison, a dotted line of the graph represents results of simulation calculation of signal components at the time of finger touch in the case of the Z electrode with slits. The axis of abscissa of the graph represents a sheet resistance of the Z electrode ZP having the solid electrode shape. Those results show that, when the interlayer distance is not changed, by increasing the sheet resistance of the Z electrode, signal components at a similar degree to that in the case of the Z electrode ZP with slits may be obtained. By increasing the sheet resistance of the Z electrode, charging/discharging of electrostatic capacity generated by the conductor of contact is enabled at only a capacity detection electrode near the conductor of contact. As described above, signal components may be detected by increasing the resistance of the Z electrode to limit the portion for charging/discharging of the electrostatic capacity.

As has been described above, the single Z electrode having the solid electrode shape with no slits is employed, to thereby obtain effects similar to those of the touch panel according to the first embodiment.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device having an electrostatic capacity touch panel that detects touch position coordinates in a display region by an electrostatic capacity coupling method, wherein the electrostatic capacity touch panel comprises:
a plurality of X electrodes;
a plurality of Y electrodes;
a plurality of Z electrodes;
each of the plurality of X electrodes and each of the plurality of Y electrodes intersect each other via a first insulating layer, and are formed so as to alternately array pad parts and thin line parts in extending directions of each of the plurality of X electrodes and each of the plurality of Y electrodes, and the pad part of each of the plurality of X electrodes and the pad part of each of the plurality of Y electrodes are disposed so as not to overlap each other in plan view;
each of the plurality of Z electrodes is formed via a second insulating layer so as to overlap both of one of the plurality of X electrodes and one of the plurality of Y electrodes which are adjacent to each other in plan view, and the plurality of Z electrodes are disposed in an electrically floating state;
in plan view, a width of the pad part of each of the plurality of Y electrodes in the extending direction of each of the plurality of X electrodes is constant with respect to the extending direction of each of the plurality of Y electrodes;
in plan view, the pad part of each of the plurality of X electrodes and the pad part of each of the plurality of Y electrodes are alternately disposed in the extending direction of each of the plurality of X electrodes;
each of the plurality of Z electrodes is divided by a plurality of slits in the extending direction of each of the plurality of Y electrodes; and
the plurality of slits dividing the plurality of Z electrodes are arranged above at least one of a center of the pad parts of the plurality of X electrodes and a center of the pad parts of the plurality of Y electrodes.

2. A display device according to claim 1, wherein the second insulating layer changes in thickness by pressing of touch.

3. A display device according to claim 2, wherein the second insulating layer is formed of an elastic insulating material.

4. A display device according to claim 1, wherein:
the pad part of the each of the plurality of X electrodes extends to a vicinity of the thin line part of one of the plurality of X electrodes adjacent to the each of the plurality of X electrodes;
in plan view, in a shape of the pad part of the each of the plurality of X electrodes, an area is smallest in the vicinity of the thin line part of the adjacent one of the plurality of X electrodes and an area is largest in the vicinity of the thin line part of the each of the plurality of X electrodes; and
an area of the pad part is reduced from the vicinity of the thin line part of the each of the plurality of X electrodes to the vicinity of the thin line part of the adjacent one of the plurality of X electrodes.

5. A display device according to claim 4, wherein:
the pad part of the each of the plurality of X electrodes has the smallest area in the vicinity of the thin line part of the adjacent X electrode, and the largest area in the vicinity of the thin line part of the each of the plurality of X electrodes; and
the pad part of the each of the plurality of X electrodes has a predetermined width at a portion of the smallest area of the each of the plurality of X electrodes.

6. A display device according to claim 1, wherein, in pad parts of two adjacent X electrodes, a shape of one of the pad parts is convex, and a shape of another one of the pad parts is concave.

7. A display device according to claim 6, wherein the each of the plurality of Z electrodes is divided by a plurality of slits in the extending direction of the each of the plurality of X electrodes.

8. A display device according to claim 1, wherein, in pad parts of two adjacent X electrodes, shapes of both the pad parts are convex.

9. A display device according to claim 1, wherein the second insulating layer is formed of a gas having a volume that changes depending on a pressure.

10. A display device according to claim 9, wherein the second insulating layer is an air layer.

11. A display device according to claim 1, wherein each of the plurality of X electrodes is disposed in a first layer, each of the plurality of Y electrodes is disposed in a second layer, and each of the plurality of Z electrodes is disposed in a third layer, the first layer being separated from the second layer by the first insulating layer, and the third layer being separated from the first layer and the second layer at least by the second insulating layer.

12. A display device according to claim 11, wherein the first layer is provided on a substrate, the first insulating layer is provided on the first layer, the second layer is provided on the first insulating layer, the second insulating layer is provided on the second layer and a part of the first insulating layer, and the third layer is provided on the second insulating layer.

13. A display device, comprising an electrostatic capacity touch panel, wherein the electrostatic capacity touch panel comprises:
- a plurality of first electrodes extending in a first direction;
- a plurality of second electrodes extending in a second direction intersecting the first direction;
- insulating layers formed on the plurality of first electrodes and the plurality of second electrodes;
- a plurality of third electrodes formed on the insulating layers;
- the plurality of first electrodes and the plurality of second electrodes are formed so as to alternately array pad parts and thin line parts;
- in plan view, the pad part of the plurality of first electrodes and the pad part of the plurality of second electrodes are disposed so as not to overlap each other, and are alternately disposed in the first direction;
- the plurality of third electrodes are formed so as to overlap both of one of the plurality of first electrodes and one of the plurality of second electrodes which are adjacent to each other in plan view, and the plurality of third electrodes are disposed in an electrically floating state;
- the plurality of third electrodes are divided by a plurality of slits in the second direction; and
- the plurality of slits dividing the plurality of third electrodes are arranged above at least one of a center of the pad parts of the plurality of first electrodes and a center of the pad parts of the plurality of second electrodes.

14. A display device according to claim 13, wherein each of the plurality of first electrodes is disposed in a first layer, each of the plurality of second electrodes is disposed in a second layer, and each of the plurality of third electrodes is disposed in a third layer, the first layer being separated from the second layer by one of the insulating layers, and the third layer being separated from the first layer and the second layer at least by another of the insulating layers.

15. A display device according to claim 14, wherein the first layer is provided on a substrate, the one of the insulating layers is provided on the first layer, the second layer is provided on the one of the insulating layers, the another of the insulating layers is provided on the second layer and a part of the one of the insulating layers, and the third layer is provided on the another of the insulating layers.

* * * * *